(12) United States Patent
Moh

(10) Patent No.: US 9,871,412 B2
(45) Date of Patent: Jan. 16, 2018

(54) WIRELESS POWER RECEPTION DEVICES

(71) Applicant: Samsung Electronics Co., Ltd., Suwon-Si, Gyeonggi-Do (KR)

(72) Inventor: Kyung-Goo Moh, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 984 days.

(21) Appl. No.: 14/104,494

(22) Filed: Dec. 12, 2013

(65) Prior Publication Data

US 2014/0191593 A1    Jul. 10, 2014

(30) Foreign Application Priority Data

Jan. 4, 2013   (KR) .................. 10-2013-0001115

(51) Int. Cl.
*H02J 17/00*   (2006.01)
*H02J 5/00*    (2016.01)

(52) U.S. Cl.
CPC .............. *H02J 17/00* (2013.01); *H02J 5/005* (2013.01)

(58) Field of Classification Search
CPC .................................. H02J 17/00; H02J 5/005
USPC ......................................................... 307/104
See application file for complete search history.

(56) References Cited

U.S. PATENT DOCUMENTS

| | | | |
|---|---|---|---|
| 6,411,119 B1 * | 6/2002 | Feldtkeller | H02M 3/33507 324/750.3 |
| 8,084,889 B2 | 12/2011 | Joannopoulos et al. | |
| 8,097,983 B2 | 1/2012 | Karalis et al. | |
| 2004/0039423 A1 * | 2/2004 | Dolgin | A61M 1/127 607/27 |
| 2005/0288739 A1 * | 12/2005 | Hassler, Jr. | A61N 1/3787 607/61 |
| 2006/0217785 A1 * | 9/2006 | Matei | A61N 1/3787 607/61 |

(Continued)

FOREIGN PATENT DOCUMENTS

| | | |
|---|---|---|
| CN | 101938151 A | 1/2011 |
| JP | 2010-187471 A | 8/2010 |

(Continued)

OTHER PUBLICATIONS

English abstract is provided for Chinese Publication No. 101938151.

(Continued)

*Primary Examiner* — Zeev V Kitov
*Assistant Examiner* — Brian K Baxter
(74) *Attorney, Agent, or Firm* — Harness, Dickey & Pierce, P.L.C.

(57) ABSTRACT

A wireless power reception device may comprise a resonance coil configured to receive power from outside of the wireless power reception device in a magnetic resonance type; a load coil inductively coupled to the resonance coil to receive the power from the resonance coil in an electromagnetic induction type; and/or a load configured to receive the power from the load coil. The load coil may be short-circuited and/or the load coil and the load may not be connected to each other during a first interval. The load coil may not be short-circuited and/or the load coil and the load may be connected to each other during a second interval that is different from the first interval.

14 Claims, 8 Drawing Sheets

(56) References Cited

U.S. PATENT DOCUMENTS

| | | | |
|---|---|---|---|
| 2007/0195562 A1* | 8/2007 | Sato | H02M 3/3376 363/21.12 |
| 2010/0164295 A1 | 7/2010 | Ichikawa et al. | |
| 2010/0244583 A1* | 9/2010 | Shimokawa | H01C 27/00 307/104 |
| 2010/0277120 A1 | 11/2010 | Cook et al. | |
| 2011/0074219 A1* | 3/2011 | Villa Gazulla | H02J 5/005 307/104 |
| 2011/0109263 A1 | 5/2011 | Sakoda et al. | |
| 2011/0278945 A1 | 11/2011 | Wheatley, III et al. | |
| 2012/0013198 A1 | 1/2012 | Uramoto et al. | |
| 2012/0104867 A1 | 5/2012 | Mudrick et al. | |
| 2012/0112553 A1 | 5/2012 | Stoner, Jr. et al. | |
| 2012/0161537 A1* | 6/2012 | Kamata | H02J 17/00 307/104 |
| 2012/0193994 A1* | 8/2012 | Kamata | H04B 5/0037 307/104 |
| 2012/0228956 A1* | 9/2012 | Kamata | H02J 7/0027 307/104 |
| 2012/0235508 A1* | 9/2012 | Ichikawa | H02J 5/005 307/104 |
| 2012/0248890 A1* | 10/2012 | Fukushima | H02J 5/005 307/104 |
| 2012/0319646 A1* | 12/2012 | Kamata | H02J 7/025 320/108 |
| 2013/0080091 A1* | 3/2013 | Kwon | G06K 19/0712 702/60 |
| 2013/0300207 A1* | 11/2013 | Wang | H04B 5/0037 307/104 |
| 2014/0091635 A1* | 4/2014 | Sugino | H01F 38/14 307/104 |
| 2014/0132210 A1* | 5/2014 | Partovi | H02J 7/025 320/108 |
| 2014/0167520 A1* | 6/2014 | Moh | H04B 5/0037 307/104 |
| 2015/0130271 A1* | 5/2015 | Suzuki | B60L 11/182 307/9.1 |
| 2015/0130272 A1* | 5/2015 | Suzuki | B60L 11/182 307/9.1 |
| 2015/0130294 A1* | 5/2015 | Suzuki | H02J 17/00 307/104 |
| 2015/0326028 A1 | 11/2015 | Suzuki et al. | |
| 2016/0056664 A1* | 2/2016 | Partovi | H02J 7/025 307/104 |

FOREIGN PATENT DOCUMENTS

| | | |
|---|---|---|
| JP | 2011-239673 A | 11/2011 |
| JP | 2012-055109 A | 3/2012 |
| JP | 5010061 B1 | 8/2012 |
| KR | 2012-0051319 A | 5/2012 |

OTHER PUBLICATIONS

Office Action for corresponding Chinese Application No. 201410005426.6 dated Jan. 6, 2014.

Office Action for corresponding Chinese Application No. 201410005426.6 dated Aug. 30, 2017.

* cited by examiner

WIRELESS POWER RECEPTION DEVICES

CROSS-REFERENCE TO RELATED APPLICATION(S)

This application claims priority from Korean Patent Application No. 10-2013-0001115, filed on Jan. 4, 2013, in the Korean Intellectual Property Office (KIPO), the entire contents of which are incorporated herein by reference.

BACKGROUND

1. Field

Some example embodiments may relate to wireless power reception devices.

2. Description of Related Art

A wireless power transmission type is classified into an electromagnetic induction type and a magnetic resonance type. The electromagnetic induction type involves induction of an electromotive force in a load-side coil using magnetic flux generated in a source-side coil, and the magnetic resonance type involves resonance of a magnetic field between a transmission resonance coil and a reception resonance coil.

SUMMARY

Some example embodiments may provide wireless power reception devices that do not require impedance matching.

In some example embodiments, a wireless power reception device may comprise a resonance coil configured to receive power from outside of the wireless power reception device in a magnetic resonance type; a load coil inductively coupled to the resonance coil to receive the power from the resonance coil in an electromagnetic induction type; and/or a load configured to receive the power from the load coil. The load coil may be short-circuited and/or the load coil and the load may not be connected to each other during a first interval. The load coil may not be short-circuited and/or the load coil and the load may be connected to each other during a second interval that is different from the first interval.

In some example embodiments, the wireless power reception device may further comprise a first switch configured to short-circuit the load coil; and/or a second switch configured to connect the load coil and the load to each other.

In some example embodiments, the wireless power reception device may further comprise a controller configured to turn on the first switch and/or turn off the second switch during the first interval.

In some example embodiments, the wireless power reception device may further comprise a controller configured to turn off the first switch and/or turn on the second switch during the second interval.

In some example embodiments, when energy that is stored in the resonance coil is peak, the load coil may not be short-circuited and/or the load coil and the load may be connected to each other.

In some example embodiments, the wireless power reception device may further comprise a current sensor configured to measure current that flows through the resonance coil. When the current is peak, the load coil may not be short-circuited and/or the load coil and the load may be connected to each other.

In some example embodiments, the wireless power reception device may further comprise a capacitor connected in parallel to the resonance coil; and/or a voltage sensor configured to measure voltage across the capacitor. When the voltage is peak, the load coil may not be short-circuited and/or the load coil and the load may be connected to each other.

In some example embodiments, the wireless power reception device may further comprise a direct current (DC)/DC converter configured to control a level of the power that is supplied from the load coil.

In some example embodiments, a wireless power reception device may comprise a resonance coil configured to receive power from outside of the wireless power reception device in a magnetic resonance type; a load configured to receive the power from the resonance coil; and/or a capacitor connected in parallel between the resonance coil and the load. The resonance coil may be connected to the capacitor and the capacitor and the load may not be connected to each other during a first interval. The resonance coil may not be connected to the capacitor and/or the capacitor and the load may be connected to each other during a second interval that is different from the first interval.

In some example embodiments, the wireless power reception device may further comprise a first switch configured to connect the resonance coil and the capacitor to each other; and/or a second switch configured to connect the capacitor and the load to each other.

In some example embodiments, the wireless power reception device may further comprise a controller configured to turn on the first switch and/or turn off the second switch during the first interval.

In some example embodiments, the wireless power reception device may further comprise a controller configured to turn off the first switch and/or turn on the second switch during the second interval.

In some example embodiments, when energy that is stored in the resonance coil is peak, the resonance coil may not be connected to the capacitor and/or the capacitor and the load may be connected to each other.

In some example embodiments, the wireless power reception device may further comprise a current sensor configured to measure current that flows through the resonance coil. When the current is peak, the resonance coil may not be connected to the capacitor and/or the capacitor and the load may be connected to each other.

In some example embodiments, the wireless power reception device may further comprise a voltage sensor configured to measure voltage across the capacitor. When the voltage is peak, the resonance coil may not be connected to the capacitor and/or the capacitor and the load may be connected to each other.

A wireless power reception device, comprising a resonance coil configured to receive power from outside of the wireless power reception device in a magnetic resonance type; a load coil inductively coupled to the resonance coil to receive the power from the resonance coil in an electromagnetic induction type during a first interval; and/or a load configured to receive the power from the load coil during a second interval that is different from the first interval.

In some example embodiments, the load coil may be short-circuited during the first interval.

In some example embodiments, the load coil may not be short-circuited during the second interval.

In some example embodiments, the load coil and the load may not be connected to each other during the second interval.

In some example embodiments, the load coil and the load may be connected to each other during the second interval.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION OF THE EMBODIMENTS

Figure 1:
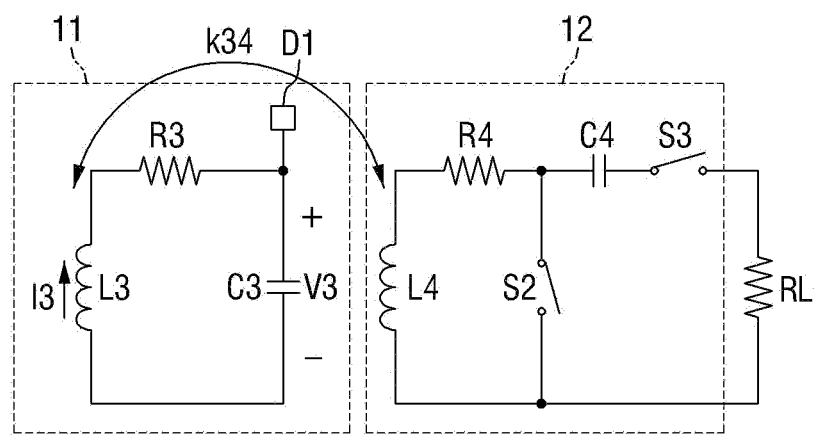
FIG. 1 is a circuit diagram schematically illustrating the configuration of a wireless power reception device according to some example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a circuit diagram schematically illustrating the configuration of a wireless power reception device according to some example embodiments.

Referring to FIG. 1, a wireless power reception device 1 according to some example embodiments includes a resonance coil unit 11, a load coil unit 12, and a load RL.

The resonance coil unit 11 includes a reception resonance coil L3, a third resistance R3, and a third capacitance C3. The reception resonance coil L3 receives power from an outside in a magnetic resonance type. The third resistance R3 may be a parasitic resistance of the reception resonance coil L3, and the third capacitance C3 may be a parasitic capacitance of the reception resonance coil L3.

The resonance coil unit 11 further includes a first sensor D1 that measures energy stored in the reception resonance coil L3. The first sensor D1 may include a current sensor that measures current 13 flowing to the reception resonance coil L3, or a voltage sensor which measures a voltage V3 across a capacitor connected in parallel to the reception resonance coil L3, that is, the third capacitance C3.

The load coil unit 12 includes a load coil L4, a fourth resistance R4, and a fourth capacitance C4. The load coil L4 receives the power in an electromagnetic induction type, and supplies the received power to the load RL. The fourth resistance R4 may be a parasitic resistance of the load coil L4, and the fourth capacitance C4 may be a parasitic capacitance of the load coil L4.

The load RL receives the power from the load coil L4.

The reception resonance coil L3 of the resonance coil unit 11 and the load coil L4 of the load coil unit 12 are inductively coupled to each other. Here, such inductive coupling means that a plurality of coils are coupled through mutual inductance, at least a part of magnetic flux generated by current flowing through a first coil is linked to a second coil, and thus current is induced in the second coil. Accordingly, the load coil L4 may receive the power from the reception resonance coil L3 in the electromagnetic induction type. The reference numeral "k34" illustrated in FIG. 1 denotes a coupling coefficient of the reception resonance coil L3 and the load coil L4.

A second switch S2 is connected in parallel to the load coil L4 to make the load coil L4 short-circuited. If the second switch S2 is in an ON state, the load coil L4 is short-circuited, and if the second switch S2 is in an OFF state, the load coil L4 is not short-circuited.

A third switch S3 is connected in series between the load coil L4 and the load RL, and the load coil L4 and the load RL can be connected to each other. If the third switch S3 is in an ON state, the load coil L4 and the load RL are connected to each other, and if the third switch S3 is in an OFF state, the load coil L4 and the load RL are not connected to each other.

If the load coil L4 in FIG. 1 is short-circuited and the fourth resistance R4 is sufficiently low, for example, if a frequency ω satisfies ωL>>R4, a phase difference between the current that flows through the load coil L4 and the voltage across the load coil L4 becomes about 90 degrees and the effective power is close to 0. In this case, the load coil L4 does not receive the power from the reception resonance coil L3, and does not supply the power to the load RL. Accordingly, in the case where the load coil L4 is short-circuited and the load coil L4 and the load RL are not connected to each other, this case is substantially the same as the case where the load RL does not exist on the side of the reception resonance coil L3.

In a magnetic resonance type wireless power transmission system including a wireless power transmission device having a source coil and a transmission resonance coil and a wireless power reception device having a reception resonance coil and a load coil, if a quality factor (Q-factor) of the resonance coils is high and a coupling coefficient of the transmission resonance coil and the reception resonance coil is relatively small under the assumption that a source coil and a load coil do not exist, temporal dependence of energy E2 that is stored in the transmission resonance coil and energy E3 that is stored in the reception resonance coil is as shown in Equation 1 and Equation 2 below. Since the derivation process of Equation 1 and Equation 2 is disclosed in Mehdi Kiani et al. "The Circuit Theory Behind Coupled-Mode Magnetic Resonance-Based Wireless Power Transmission", IEEE Trans. On Circuits and Systems-I, Vol. 59, No. 8, August 2012, the detailed description thereof will be omitted.

$$E2(t) = e^{-\frac{\omega}{Q}t}\cos^2\left(\frac{\omega k23 t}{2}\right) \quad \text{[Equation 1]}$$

$$E3(t) = e^{-\frac{\omega}{Q}t}\sin^2\left(\frac{\omega k23 t}{2}\right) \quad \text{[Equation 2]}$$

In Equation 1 and Equation 2, ω denotes a frequency, Q denotes a Q-factor of the resonance coils, and "k23" denotes a coupling coefficient of the transmission resonance coil and the reception resonance coil.

Figure 2:
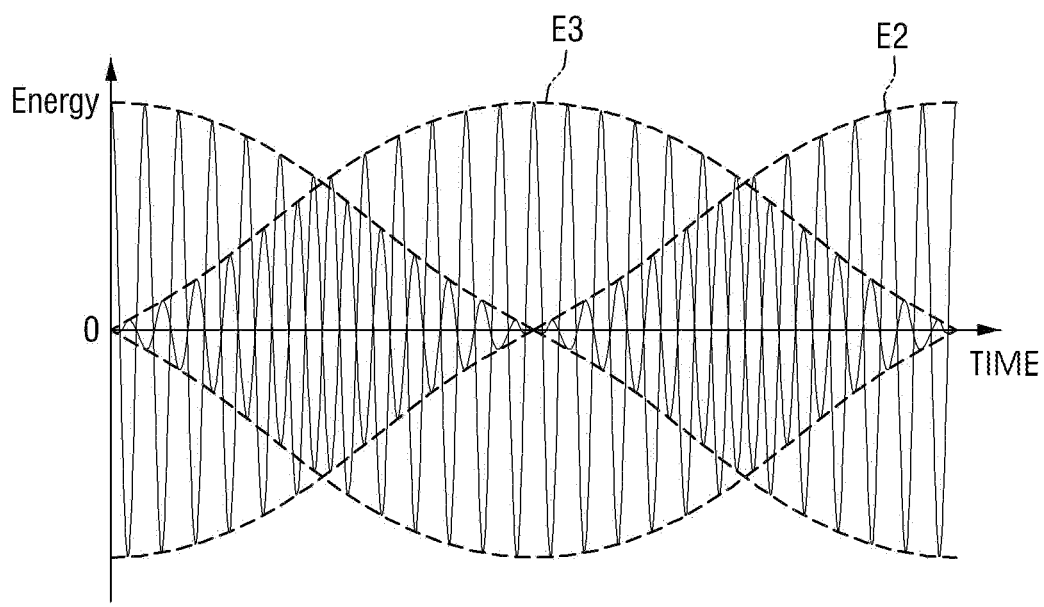
FIG. 2 is a diagram explaining energy stored in a resonance coil in the wireless power reception device of FIG. 1.

Referring to FIG. 2, in the case of a small load, it can be known that the energy E2 that is stored in the transmission resonance coil of the wireless power transmission device and the energy E3 that is stored in the reception resonance coil of the wireless power reception device oscillate with a phase difference of 90 degrees. Accordingly, when the energy E2 that is stored in the transmission resonance coil is minimized, the energy E3 that is stored in the reception resonance coil is maximized. Through this, most of the energy E2 that is stored in the transmission resonance coil can be transmitted to the reception resonance coil.

Accordingly, in the wireless power reception device 1 according to some example embodiments, the second switch S2 is turned on at a first time to make the load coil L4 short-circuited, and the third switch S3 is turned off to make the load coil L4 not connected to the load RL. Accordingly, the reception resonance coil L3 receives the power from the outside in the magnetic resonance type, but the load coil L4 does not receive the power from the reception resonance coil L3 and does not supply the power to the load RL. Since this case is substantially the same as a case where the load RL does not exist on the side of the reception resonance coil L3, impedance matching is not required.

Further, the second switch S2 is turned off at a second time that is different from the first time to make the load coil L4 not short-circuited, and the third switch S3 is turned to make the load coil L4 connected to the load RL. Accordingly, the load coil L4 receives the power from the reception resonance coil L3, and supplies the power to the load RL.

Here, at the second time, the energy that is stored in the reception resonance coil L3 may become peak. As described above, the first sensor D1 can measure current 13 that flows through the reception resonance coil L3, and when the current is peak, the second switch S2 may be turned off and the third switch S3 may be turned on. Further, the first sensor D1 can measure a voltage V3 across the third capacitance C3, and when the voltage is peak, the second switch S2 may be turned off and the third switch S3 may be turned on.

As described above, according to the wireless power reception device according to some example embodiments, the maximum energy can be transferred to the reception resonance coil L3 regardless of the size of the load RL, and the impedance matching is not required.

Figure 3:
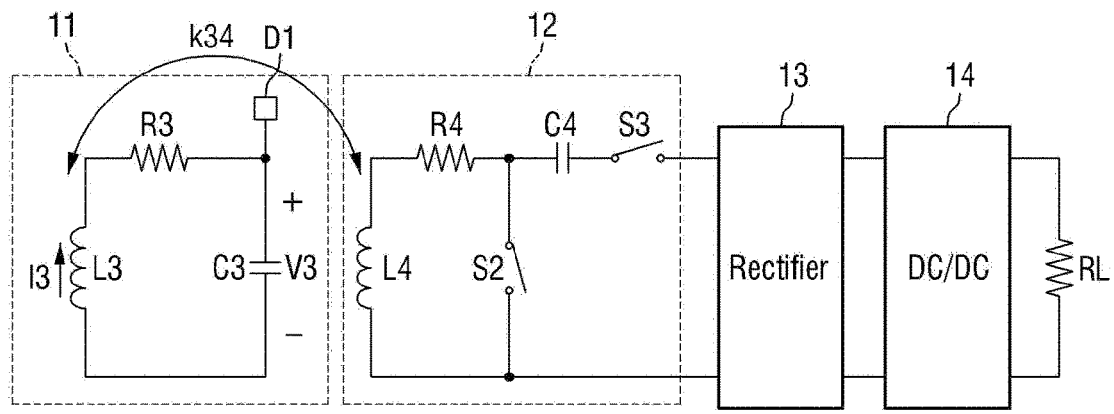
FIG. 3 is a circuit diagram schematically illustrating the configuration of a wireless power reception device according to some example embodiments.

FIG. 3 is a circuit diagram schematically illustrating the configuration of a wireless power reception device according to some example embodiments. For convenience in explanation, the detailed explanation will be made around a different point from that illustrated in FIG. 1.

Referring to FIG. 3, a wireless power reception device 2 according to some example embodiments further includes a rectifier 13, and a DC/DC converter 14.

The rectifier 13 converts alternating current (AC) power that the load coil L4 supplies into direct current (DC) power. The rectifier 13 may include, for example, a full-bridge circuit, but is not limited thereto.

The DC/DC converter 14 controls the level of DC power converted by the rectifier 13, and supplies the converted power to the load RL. By the DC/DC converter 14, the level of the power supplied to the load RL can be constantly controlled.

Figure 4:
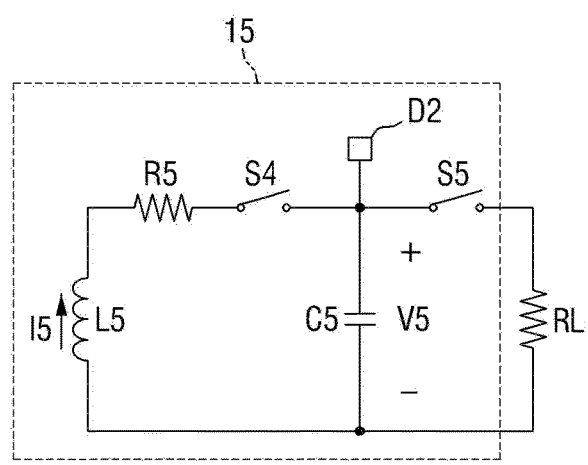
FIG. 4 is a circuit diagram schematically illustrating the configuration of a wireless power reception device according to some example embodiments.

FIG. 4 is a circuit diagram schematically illustrating the configuration of a wireless power reception device according to some example embodiments.

Referring to FIG. 4, a wireless power reception device 3 according to some example embodiments includes a resonance coil unit 15 and a load RL.

The resonance coil unit 15 includes a reception resonance coil L5, a fifth resistance R5, and a fifth capacitance C5. The reception resonance coil L5 receives power from an outside in a magnetic resonance type. The fifth resistance R5 may be a parasitic resistance of the reception resonance coil L5, and the fifth capacitance C5 may be a parasitic capacitance of the reception resonance coil L5. The reception resonance coil L5 illustrated in FIG. 4 may correspond to a combination of the reception resonance coil L3 and the load coil L4 illustrated in FIG. 1 and FIG. 2.

The resonance coil unit 15 further includes a second sensor D2 that measures energy stored in the reception resonance coil L5. The second sensor D2 may include a current sensor that measures current I5 flowing to the reception resonance coil L5, or a voltage sensor that measures a voltage V5 across a capacitor connected in parallel to the reception resonance coil L5, that is, the fifth capacitance C5.

The load RL receives the power from the reception resonance coil L5.

A fourth switch S4 is connected in series between the reception resonance coil L5 and the capacitor C5 to enable the reception resonance coil L5 and the capacitor C5 to be connected to each other. If the fourth switch S4 is in an ON state, the reception resonance coil L5 and the capacitor C5 are connected to each other, while if the fourth switch S4 is in an OFF state, the reception resonance coil L5 and the capacitor C5 are not connected to each other.

A fifth switch S5 is connected in series between the capacitor C5 and the load RL to enable the capacitor C5 and the load RL to be connected to each other. If the fifth switch S5 is in an ON state, the capacitor C5 and the load RL are connected to each other, while if the fifth switch S5 is in an OFF state, the capacitor C5 and the load RL are not connected to each other.

In FIG. 4, if the reception resonance coil L5 and the capacitor C5 are connected to each other and the capacitor C5 and the load RL are not connected to each other, the energy stored in the reception resonance coil L5 is mostly transmitted to the capacitor C5, and the load RL does not receive the power. This case is substantially the same as the case where the load RL does not exist on the side of the reception resonance coil L5.

If the reception resonance coil L5 is open-circuited and the capacitor C5 and the load RL are connected to each other, the current flowing through the reception resonance coil L5 becomes 0, and the effective power becomes close to 0. Further, as the energy stored in the capacitor C5 is transmitted to the load RL, the load RL receives the power. However, if the frequency is high, it is necessary to consider the point where the parasitic capacitance of the reception resonance coil L5 becomes large.

Accordingly, in the wireless power reception device 3 according to some example embodiments, the fourth switch S4 is turned on at the first time to make the reception resonance coil L5 and the capacitor C5 connected to each other, and the fifth switch S5 is turned off to make the capacitor C5 and the load RL not connected to each other.

Accordingly, the reception resonance coil L5 receives the power from the outside in the magnetic resonance type, but does not supply the power to the load RL, and the energy of the reception resonance coil L5 is stored in the capacitor C5. Further, since this case is substantially the same as the case where the load RL does not exist on the side of the reception resonance coil L5, the impedance matching is not required.

Further, the fourth switch S4 is turned off at the second time that is different from the first time to make the reception resonance coil L5 and the capacitor C5 not connected to each other, and the fifth switch S5 is turned to make the capacitor C5 and the load RL connected to each other. Accordingly, the load RL receives the power while receiving the energy stored in the capacitor C5.

Here, at the second time, the energy that is stored in the reception resonance coil L5 may become peak. As described above, the second sensor D2 can measure current IS that flows through the reception resonance coil L5, and when the current is peak, the fourth switch S4 may be turned off and the fifth switch S5 may be turned on. Further, the second sensor D2 can measure a voltage V5 across the capacitor C5, and when the voltage is peak, the fourth switch S4 may be turned off and the fifth switch S5 may be turned on.

As described above, according to the wireless power reception device according to some example embodiments, the maximum energy can be transferred to the reception resonance coil L5 regardless of the size of the load RL, and the impedance matching is not required.

Figure 5:
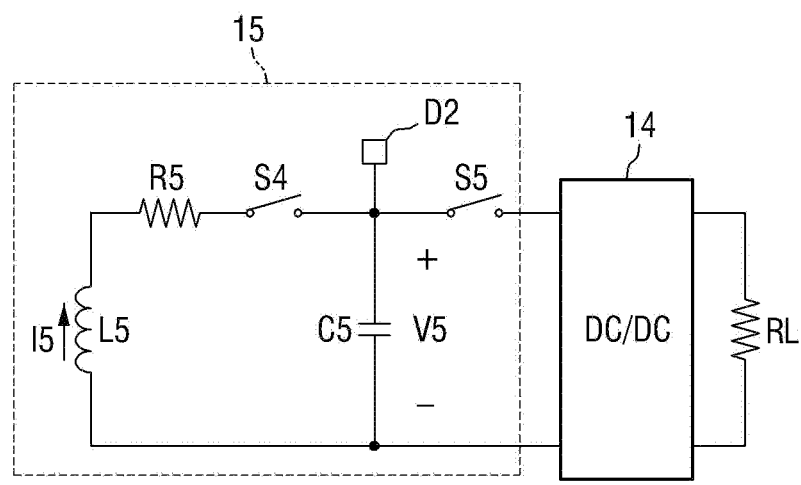
FIG. 5 is a circuit diagram schematically illustrating the configuration of a wireless power reception device according to some example embodiments.

FIG. 5 is a circuit diagram schematically illustrating the configuration of a wireless power reception device according to some example embodiments. For convenience in explanation, the detailed explanation will be made around a different point from that illustrated in FIG. 4.

Referring to FIG. 5, a wireless power reception device 4 according to some example embodiments further includes a DC/DC converter 14.

The DC/DC converter 14 controls the level of the power that is supplied from the reception resonance coil L5, and supplies the controlled power to the load RL. By the DC/DC converter 14, the level of the power supplied to the load RL can be constantly controlled.

Figure 6:
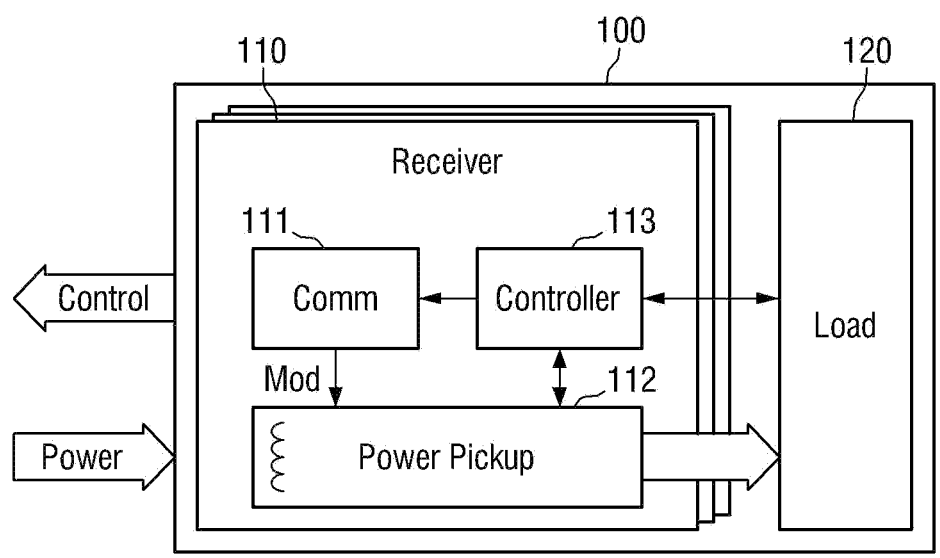
FIG. 6 is a block diagram schematically illustrating the control configuration of a wireless power reception device according to some example embodiments.

FIG. 6 is a circuit diagram schematically illustrating the configuration of a wireless power reception device according to some example embodiments.

Referring to FIG. 6, a wireless power reception device 100 according to some example embodiments includes a receiver 110 and a load 120.

The receiver 110 includes a controller 113, a communicator (Comm) 111, and a power pickup 112.

The power pickup 112 receives the wireless power signal from the wireless power transmission device in the magnetic resonance type, converts the wireless power signal into power to supply the power to the load 120. In the wireless power reception devices 1-4 in FIGS. 1 and 3-5, the resonance coil unit 11, the load coil unit 12, and/or the reception resonance coil 15 may be arranged on the power pickup 112.

The controller 113 transmits control information to the communicator 111 to be described later, and controls an operation point of the power pickup 112 and on/off operations of the switches S2-S5. Here, the operation point may include, for example, current or voltage that is output to the load RL, and resonance frequencies of the reception resonance coils L3 and L5. The controller 113 may control the power supplied to the load 120.

The communicator 111 transmits control information to the wireless power transmission device. The communicator 111 may transmit the control information through modulation of a reflected load. The control information may include, for example, a target power value that is required in the wireless power reception device, and a reception power value that is transferred to the load of the wireless power reception device. A method for transmitting the control information to the wireless power transmission device will be described with reference to FIG. 7.

Figure 7:
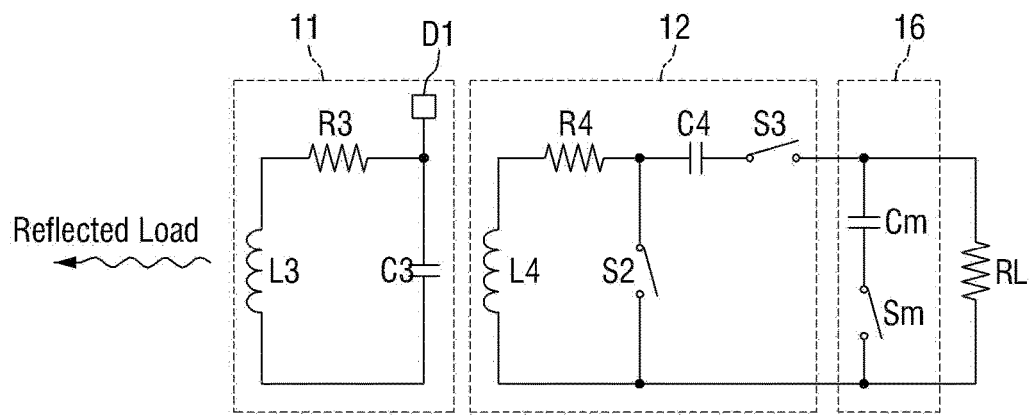
FIG. 7 is a diagram explaining that the wireless power reception device of FIG. 6 transmits control information.

FIG. 7 is a diagram explaining that the wireless power reception device of FIG. 6 transmits control information.

Referring to FIG. 7, a modulator 16 may be installed between a load coil unit 12 of a power pickup 112 and the load RL. The modulator 16 may include a modulation capacitance Cm and a modulation switch Sm.

The modulator 16 may connect the modulation capacitance Cm to the load RL by turning on/off the modulation switch Sm, and may modulate the reflected load by modulating the load. The communicator 111 may modulate the reflected load in accordance with the control information received from the controller 113.

The load 120 includes the load RL and a reception power measurement circuit (not illustrated). In the above-described wireless power reception devices 1-4 illustrated in FIGS. 1 and 3-5, the load RL may be arranged on the load 120. The reception power measurement circuit may transmit the measured reception power value to the controller 113 of the receiver 110.

Figure 8:
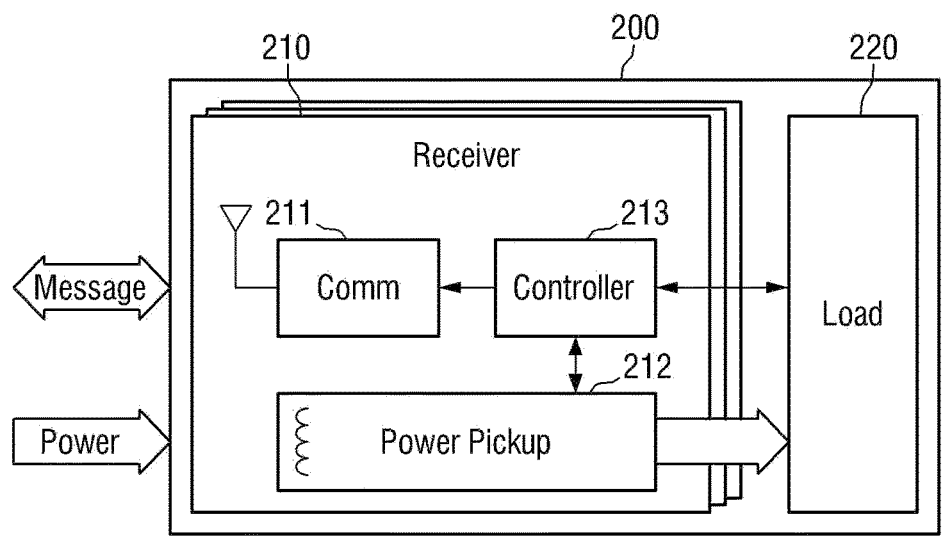
FIG. 8 is a block diagram schematically illustrating the control configuration of a wireless power reception device according to some example embodiments.

FIG. 8 is a block diagram schematically illustrating the control configuration of a wireless power reception device according to some example embodiments. For convenience in explanation, the detailed explanation will be made around the different point from that illustrated in FIG. 6.

Referring to FIG. 8, in a wireless power reception device 200 according to some example embodiments, a communicator 211 may form a communication network that is separate from the communicator of the wireless power transmission device, and may transmit/receive various kinds of messages. The various kinds of messages may include, for example, a target power value that is required in the wireless power reception device, and a reception power value that is transferred to the load of the wireless power reception device. Unlike the wireless power reception device illustrated in FIG. 6, the wireless power reception device 200 does not use the modulation of the reflected load.

The wireless power reception device 200 also may include receiver 210, power pickup 212, controller 213, and load 220.

Figure 9:
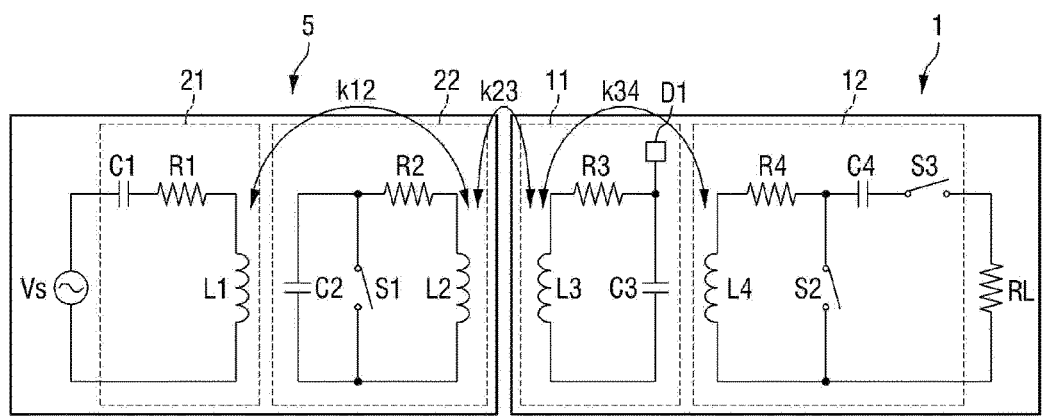
FIG. 9 is a circuit diagram schematically illustrating the configuration of a wireless power transmission device according to some example embodiments.

FIG. 9 is a circuit diagram schematically illustrating the configuration of a wireless power transmission device according to some example embodiments.

Referring to FIG. 9, a wireless power transmission device 5 according to some example embodiments includes a source voltage Vs, a source coil unit 21, and a resonance coil unit 22.

The source voltage Vs supplies AC power to the source coil unit 21.

The source coil unit 21 includes a source coil L1, a first resistance R1, and a first capacitance C1. The source coil L1 receives the power from the source voltage Vs, and transmits the power to a transmission resonance coil L2 in an electromagnetic induction type. The first resistance R1 may be a parasitic resistance of the source coil L1, and the first capacitance C1 may be a parasitic capacitance of the source coil L1.

The resonance coil unit 22 includes a transmission resonance coil L2, a second resistance R2, and a second capacitance C2. The transmission resonance coil L2 transmits the power to the wireless power reception device 1 in the magnetic resonance type. The second resistance R2 may be a parasitic resistance of the transmission resonance coil L2, and the second capacitance C2 may be a parasitic capacitance of the transmission resonance coil L2. The reference numeral "k23" denotes a coupling coefficient of the transmission resonance coil L2 and the reception resonance coil L3 of the wireless power reception device 1.

The source coil L1 of the source coil unit 21 and the transmission resonance coil L2 of the resonance coil unit 22 are inductively coupled to each other. Accordingly, the source coil L1 may transmit the power to the transmission resonance coil L2 in the electromagnetic induction type. The reference numeral "k12" illustrated in FIG. 1 denotes a coupling coefficient of the source coil L1 and the transmission resonance coil L2.

A first switch S1 is connected in parallel to the transmission resonance coil L2 to make the transmission resonance coil L2 short-circuited. If the first switch S1 is in an ON state, the transmission resonance coil L2 is short-circuited, and if the first switch S1 is in an OFF state, the transmission resonance coil L2 is not short-circuited.

In FIG. 9, if the transmission resonance coil L2 is short-circuited and the second resistance R2 is sufficiently low, an effective power of the transmission resonance coil L2 is close to 0 as described above with reference to FIG. 1. In this case, the transmission resonance coil L2 does not receive the energy that is reflected from the reception resonance coil L3 of the wireless power reception device 1.

Accordingly, in the wireless power transmission device 5 according to some example embodiments, the first switch S1 is in an ON state and the transmission resonance coil L2 is short-circuited at a first time. Thus, the transmission resonance coil L2 does not receive the energy reflected from the wireless power reception device 1. Further, the first switch S1 is in an OFF state and the transmission resonance coil L2 is not short-circuited at a second time that is different from the first time. Accordingly, the transmission resonance coil L2 can transmit the power to the wireless power reception device 1 in the magnetic resonance type.

Accordingly, when the energy that is stored in the reception resonance coil L3 of the wireless power reception device 1 is peak, the energy stored in the reception resonance coil L3 is entirely transmitted to the load RL, and is not reflected to the transmission resonance coil L2.

Figure 10:
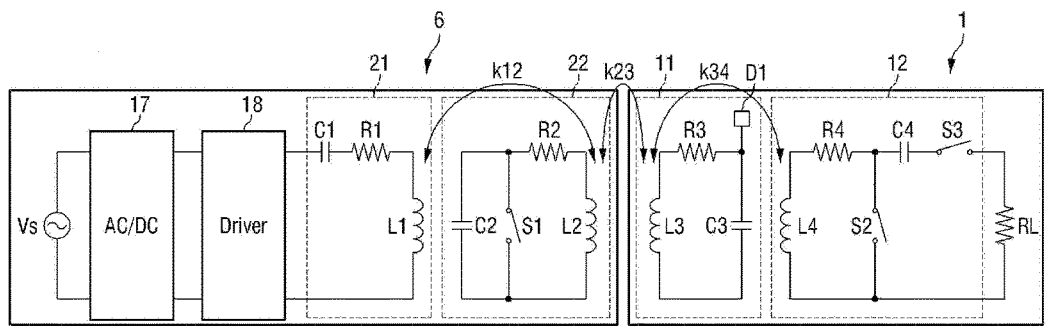
FIG. 10 is a circuit diagram schematically illustrating the configuration of a wireless power transmission device according to some example embodiments.

FIG. 10 is a circuit diagram schematically illustrating the configuration of a wireless power transmission device according to some example embodiments. For convenience in explanation, the detailed explanation will be made around a different point from that illustrated in FIG. 7.

Referring to FIG. 10, a wireless power transmission device 6 according to some example embodiments further includes an AC/DC converter 17 and a driver 18.

The AC/DC converter 17 converts AC power that the source voltage Vs supplies into DC power.

The driver 18 converts the DC power converted by the AC/DC converter 17 into a wireless power signal, controls the frequency, and supplies the wireless power signal to the source coil L1. The driver may include an inverter, for example, a half-bridge circuit or a power amplifier, but is not limited thereto. In accordance with a switching frequency of the half-bridge circuit, the frequency of the wireless power signal that is supplied to the source coil L1 may be controlled.

Figure 11:
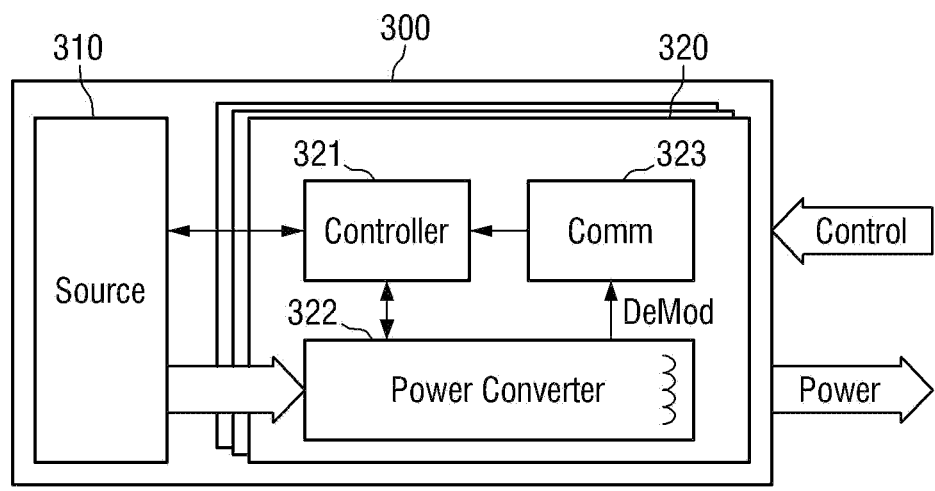
FIG. 11 is a block diagram schematically illustrating the control configuration of a wireless power transmission device according to some example embodiments.

FIG. 11 is a block diagram schematically illustrating the control configuration of a wireless power transmission device according to some example embodiments.

Referring to FIG. 11, a wireless power transmission device 300 according to some example embodiments includes a source 310 and a transmitter 320.

The source 310 includes a source voltage Vs and a supplied power measurement circuit (not illustrated). In the wireless power transmission devices 5 and 6 according to some example embodiments, as illustrated in FIGS. 9 and 10, the source voltage Vs may be arranged on the source 310. The supplied power measurement circuit may measure a supplied power value that the source voltage Vs supplies to the source coil L1. The supplied power measurement circuit may transmit may transmit the measured supplied power value to the transmitter 320 to be described later.

The wireless power transmission device 300 may include a plurality of transmitters 320. Although FIG. 11 illustrates three transmitters, example embodiments are not limited thereto.

The transmitter 320 includes a controller 321, a communicator (Comm) 323, and a power converter 322.

The power converter 322 converts the power that is supplied from the source 310 into a wireless power signal, and transmits the power to the wireless power reception device in the magnetic resonance method. In the wireless power transmission devices 6 and 7 in FIGS. 9 and 10, the source coil unit 21 and the resonance coil unit 22 may be arranged on the power converter 322.

The controller 321 receives control information from the communicator 323 to be described later, and controls an operation point of the power converter 322 and an on/off operation of the switch S1. Here, the operation point may include, for example, current that flows through the transmission resonance coil L2 and resonance frequency of the transmission resonance coil L2. The controller 321 may control the power that is supplied by the source 310.

The communicator 323 may receive the control information through demodulation of a reflected load. The communicator 323 may transmit the received control information to the controller 321. The control information may include, for example, a target power value that is required in the wireless power reception device, and a reception power value that is transferred to the load of the wireless power reception device. A method for receiving the control information to the wireless power reception device will be described with reference to FIG. 12.

Figure 12:
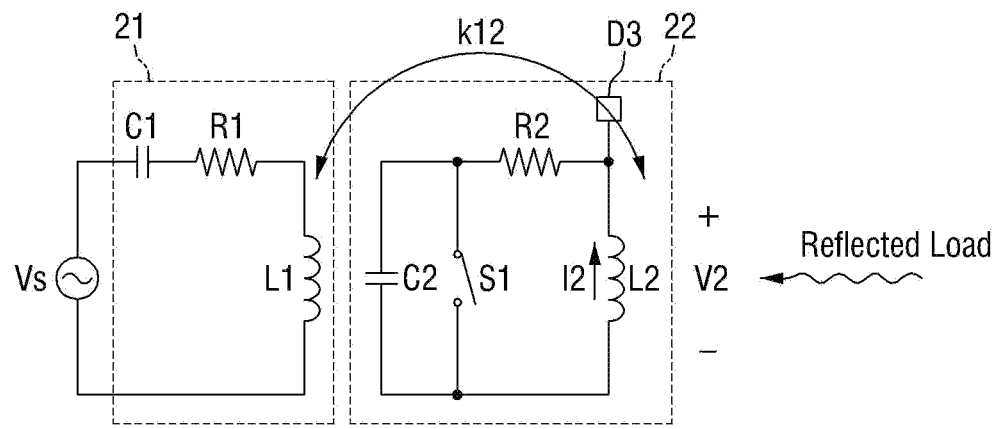
FIG. 12 is a diagram explaining that the wireless power transmission device of FIG. 11 receives control information.

FIG. 12 is a diagram explaining that the wireless power transmission device of FIG. 11 receives control information.

Referring to FIG. 12, a measurement sensor D3 may be installed on the transmission resonance coil L2 of the power converter 322. The measurement sensor D3 may measure the current I2 that flows through the transmission resonance coil L2 and/or the voltage V2 of the transmission resonance coil L2.

The communicator 323 may receive the control information through modulation of the reflected load based on the current value and/or the voltage value measured by the measurement sensor D3. The wireless power reception device may modulate the reflected load through modulation of the load as described above.

Figure 13:
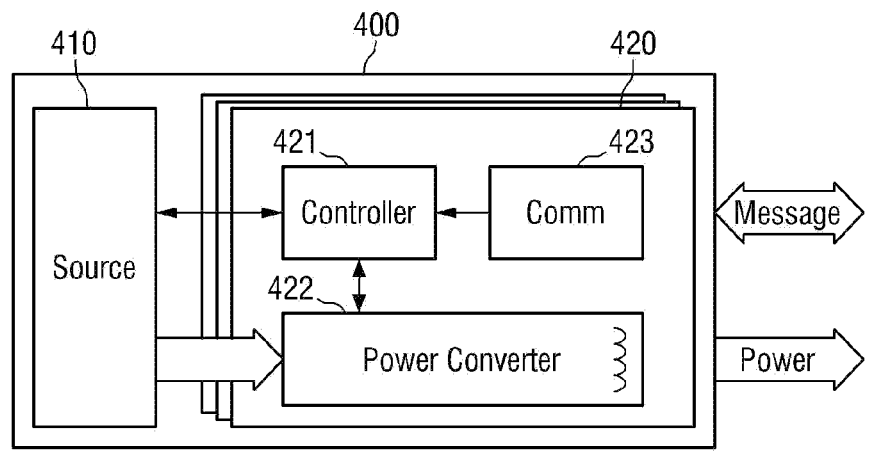
FIG. 13 is a block diagram schematically illustrating the control configuration of a wireless power transmission device according to some example embodiments.

FIG. 13 is a block diagram schematically illustrating the control configuration of a wireless power transmission device according to some example embodiments. For convenience in explanation, the detailed explanation will be made around the different point from that illustrated in FIG. 11.

Referring to FIG. 13, in a wireless power transmission device 400 according to some example embodiments, a communicator 423 may form a communication network that is separate from the communicator of the wireless power reception device, and may transmit/receive various kinds of messages. The various kinds of messages may include, for example, a target power value that is required in the wireless power reception device, and a reception power value that is transferred to the load of the wireless power reception device. Unlike the wireless power transmission device illustrated in FIG. 11, the wireless power transmission device 400 does not use the modulation of the reflected load.

The wireless power transmission device 400 also may include source 410, transmitter 420, controller 421, and power converter 422.

Hereinafter, an electronic system including a wireless power reception device and a wireless power transmission device according to some example embodiments will be described.

Figure 14:
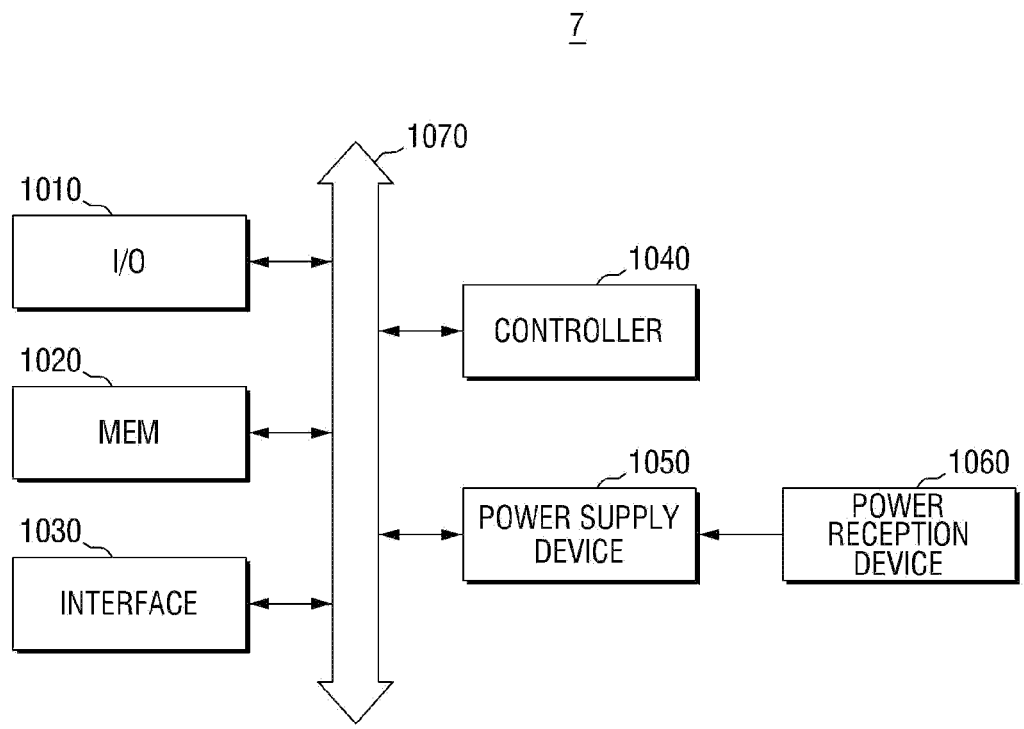
FIG. 14 is a block diagram schematically illustrating the configuration of an electronic system including a wireless power reception device according to some example embodiments.

FIG. 14 is a block diagram schematically illustrating the configuration of an electronic system including a wireless power reception device according to some example embodiments.

Referring to FIG. 14, an electronic system 7 may include a controller 1040, an input/output (I/O) device 1010, a memory 1020, an interface 1030, a power supply device 1050, a power reception device 1060, and a bus 1070. The controller 1040, the I/O device 1010, the memory 1020, the interface 1030, and/or the power supply device 1050 may be coupled to one another through the bus 1070. The bus 1070 corresponds to paths through which data is transferred.

The controller 1040 may include at least one of a microprocessor, a digital signal processor, a microcontroller, and logic elements that can perform similar functions. The I/O device 1010 may include a keypad, a keyboard, and a display device. The memory 1020 may store data and/or commands. The interface 1030 may function to transmit data to a communication network or to receive data from the communication network. The interface 1030 may be of a wired or wireless type. For example, the interface 1030 may include an antenna or a wire/wireless transceiver. The power supply device 1050 may include, for example, a battery. The power reception device 1060 may receive the wireless power from the outside and may transmit the wireless power to the power supply device 1050. Although not illustrated, the electronic system 7 may further include a high-speed dynamic random-access memory (DRAM) and/or static random-access memory (SRAM) as an operating memory for improving the operation of the controller 1040.

The wireless power reception devices 1-4 according to some example embodiments may be provided as a part of the power reception device 1060.

The electronic system 7 may be applied to a personal digital assistant (PDA), a portable computer, a web tablet, a wireless phone, a mobile phone, a digital music player, a memory card, or all electronic devices that can transmit and/or receive information in wireless environments.

Figure 15:
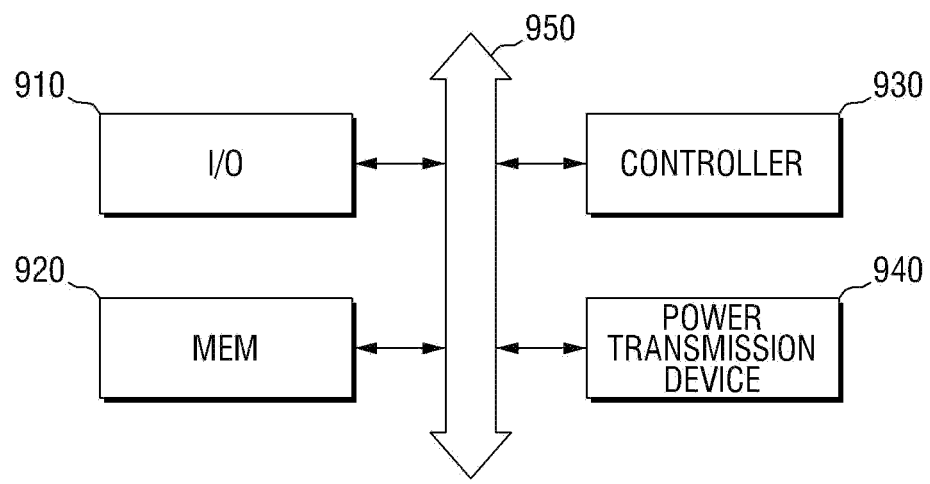
FIG. 15 is a block diagram schematically illustrating the configuration of an electronic system including a wireless power transmission device according to some example embodiments.

FIG. 15 is a block diagram schematically illustrating the configuration of an electronic system including a wireless power transmission device according to some example embodiments.

Referring to FIG. 15, an electronic system 8 may include a controller 930, an I/O device 910, a memory 920, a power transmission device 940, and a bus 950. The controller 930, the I/O device 910, the power transmission device 940, and/or the memory 920 may be coupled to one another through the bus 950. The bus 950 corresponds to paths through which data is transferred.

The controller 930 may include at least one of a microprocessor, a digital signal processor, a microcontroller, and logic elements that can perform similar functions. The I/O device 910 may include a keypad, a keyboard, and a display device. The memory 920 may store data and/or commands. The power transmission device 940 may transmit the power to the outside. Although not illustrated, the electronic system 8 may further include a high-speed DRAM and/or SRAM as an operating memory for improving the operation of the controller 930.

The wireless power transmission devices 5 and 6 according to some example embodiments may be provided as a part of the power transmission device 940.

Figure 16:
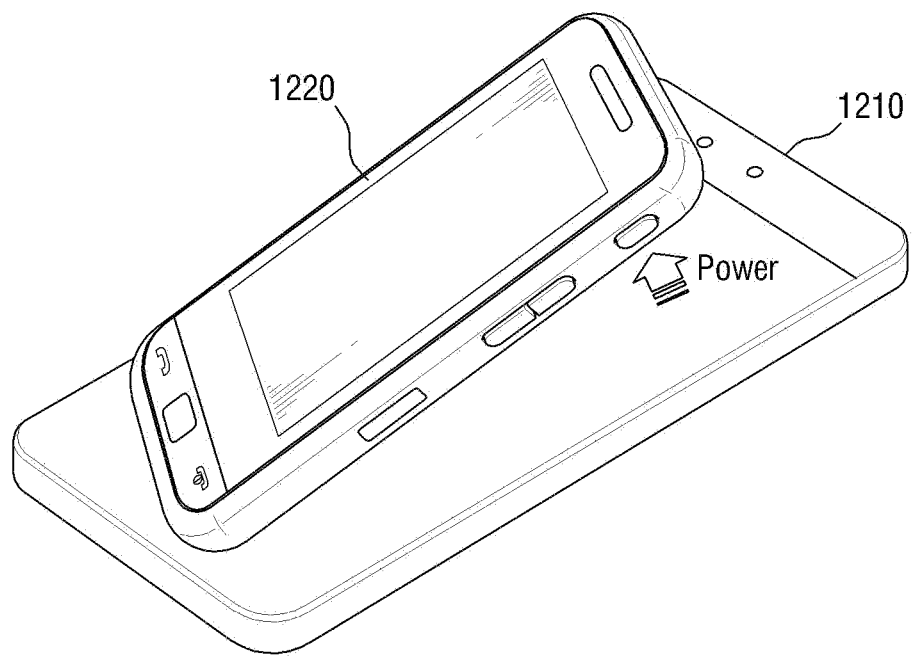
FIG. 16 is a conceptual diagram explaining transmission and reception of power through a wireless power transmission system according to some example embodiments.

FIG. 16 is a conceptual diagram explaining transmission and reception of power through a wireless power transmission system according to some example embodiments.

In a wireless power transmission system according to some example embodiments, a wireless power transmission device 1210 may transmit power to a wireless power reception device 1220 in a non-contact manner. As the wireless power reception device, the reference numeral "1210" denotes a mobile phone. However, the wireless power reception device is not limited thereto, but may be applied to a tablet personal computer (PC) and a notebook computer in the same manner. It is apparent to those of skilled in the art that the wireless power reception device in the wireless power transmission system according some example embodiments can be applied to other non-exemplified integrated circuit devices.

While example embodiments have been particularly shown and described, it will be understood by those of ordinary skill in the art that various changes in form and details may be made therein without departing from the spirit and scope of the present invention as defined by the following claims.

What is claimed is:

1. A wireless power reception device, comprising:
   a resonance coil configured to receive power from outside of the wireless power reception device in a magnetic resonance type;
   a load coil inductively coupled to the resonance coil to receive the power from the resonance coil in an electromagnetic induction type; and
   a load configured to receive the power from the load coil;
   wherein the load coil is short-circuited and the load coil and the load are not connected to each other during a first interval, and
   wherein the load coil is not short-circuited and the load coil and the load are connected to each other during a second interval that is different from the first interval.

2. The wireless power reception device of claim 1, further comprising:
   a first switch configured to short-circuit the load coil; and
   a second switch configured to connect the load coil and the load to each other.

3. The wireless power reception device of claim 2, further comprising:
   a controller configured to turn on the first switch and turn off the second switch during the first interval.

4. The wireless power reception device of claim 2, further comprising:
   a controller configured to turn off the first switch and turn on the second switch during the second interval.

5. The wireless power reception device of claim 1, wherein when energy that is stored in the resonance coil is peak, the load coil is not short-circuited and the load coil and the load are connected to each other.

6. The wireless power reception device of claim 1, further comprising:
   a current sensor configured to measure current that flows through the resonance coil;
   wherein when the current is peak, the load coil is not short-circuited and the load coil and the load are connected to each other.

7. The wireless power reception device of claim 1, further comprising:
   a capacitor connected in parallel to the resonance coil; and
   a voltage sensor configured to measure voltage across the capacitor;
   wherein when the voltage is peak, the load coil is not short-circuited and the load coil and the load are connected to each other.

8. The wireless power reception device of claim 1, further comprising:
   a direct current DC/DC converter configured to control a level of the power that is supplied from the load coil.

9. A wireless power reception device, comprising:
   a resonance coil configured to receive power from outside of the wireless power reception device in a magnetic resonance type;
   a load configured to receive the power from the resonance coil;
   a capacitor connected in parallel between the resonance coil and the load;
   a first switch configured to connect the resonance coil and the capacitor to each other; and
   a second switch configured to connect the capacitor and the load to each other,
   wherein the resonance coil is connected to the capacitor and the capacitor and the load are not connected to each other during a first interval, and
   wherein the resonance coil is not connected to the capacitor and the capacitor and the load are connected to each other during a second interval that is different from the first interval,
   wherein the first and second switches operate in opposite states during the first and second intervals.

10. The wireless power reception device of claim 9, further comprising:

a controller configured to turn on the first switch and turn off the second switch during the first interval.

11. The wireless power reception device of claim 9, further comprising:
a controller configured to turn off the first switch and turn on the second switch during the second interval.

12. The wireless power reception device of claim 9, wherein when energy that is stored in the resonance coil is peak, the resonance coil is not connected to the capacitor and the capacitor and the load are connected to each other.

13. The wireless power reception device of claim 9, further comprising:
a current sensor configured to measure current that flows through the resonance coil;
wherein when the current is peak, the resonance coil is not connected to the capacitor and the capacitor and the load are connected to each other.

14. The wireless power reception device of claim 9, further comprising:
a voltage sensor configured to measure voltage across the capacitor;
wherein when the voltage is peak, the resonance coil is not connected to the capacitor and the capacitor and the load are connected to each other.

* * * * *